United States Patent
Jin et al.

(10) Patent No.: US 8,254,457 B2
(45) Date of Patent: Aug. 28, 2012

(54) VIDEO SIGNAL PROCESSING METHOD AND APPARATUS THEREOF

(75) Inventors: Song Jin, San Jose, CA (US); I-Ming Pao, Taipei County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 982 days.

(21) Appl. No.: 12/254,823

(22) Filed: Oct. 20, 2008

(65) Prior Publication Data

US 2010/0098164 A1 Apr. 22, 2010

(51) Int. Cl.
*H04N 7/12* (2006.01)

(52) U.S. Cl. .......... 375/240.16; 375/240.25; 375/240.21

(58) Field of Classification Search .......................... None
See application file for complete search history.

(56) References Cited

U.S. PATENT DOCUMENTS

| 7,068,325 B2* | 6/2006 | Gengintani et al. .......... 348/604 |
| 2004/0008777 A1* | 1/2004 | Swartz ...................... 375/240.12 |
| 2012/0020413 A1* | 1/2012 | Chen et al. ................ 375/240.26 |
| 2012/0051442 A1* | 3/2012 | Cristarella et al. ........ 375/240.27 |

OTHER PUBLICATIONS

"Deinterlacing" in Wikipedia as printed out in 2011.*
http://scanline.ca/deinterlacing/, as printed out in 2011.*
Adobe After Effects CS5 & CS5.5 Interlaced video and separating fields, as printed out in 2011.*
Deinterlacing (Lair of the Multimedia Guru >> Deinterlacing filters, Jun. 9, 2006 and Jun. 21, 2006; http://guru.multimedia.cx/deinterlacing-filters/ ).*

* cited by examiner

*Primary Examiner* — David Y Jung
(74) *Attorney, Agent, or Firm* — Winston Hsu; Scott Margo

(57) ABSTRACT

A method of processing an interleaved video including a plurality of fields includes receiving a top field and a bottom field successively; selecting one of the top field and the bottom field as a selected field; and generating an interpolated field for replacing an unselected field of the top field and the bottom field, wherein a field motion between the selected field and the interpolated field is less than a field motion between the top field and the bottom field.

14 Claims, 5 Drawing Sheets

Picture
720x480

VIDEO SIGNAL PROCESSING METHOD AND APPARATUS THEREOF

BACKGROUND OF THE INVENTION

1. Field of the Invention

The present invention relates to processing video signals, and more particularly, to a video processing method and apparatus capable of processing interleaved video signals by dynamically selecting a field from a top field and a bottom field of the interleaved video signals and then creating an interpolated field for replacing the unselected field of the top field and the bottom field.

2. Description of the Prior Art

A video encoder receives video pictures as input signals, and generates a compressed bitstream as output signals. In general, the video encoder can be implemented by either a field-mode encoder design or a frame-mode encoder. The field-mode encoder requires each field of the interleaved video signal to be delivered to the video encoder separately as an input picture and then encoded. The frame-mode encoder, however, requires a top field and a bottom field of the interleaved video signal to be combined together as an input picture for the video encoder.

Please refer to FIG. 1. FIG. 1 is a diagram illustrating an input of a conventional field-mode encoder. FIG. 2 is a diagram illustrating an input of a conventional frame-mode encoder. As shown in FIG. 1, input of the video encoder includes sequential fields belonging to top fields and bottom fields. Taking the interleaved NTSC signal (i.e. 480$i$ TV signal) as an example, a top field (also called "odd field") has a plurality of odd scan lines within a video picture, and a bottom field (also called "even field") has a plurality of even scan lines within a video picture. When the video encoder is configured to operate in the field mode, a top field is delivered to the video encoder as an input picture having an equivalent resolution of 720×240, and the next input picture of the video encoder will be a bottom field having an equivalent resolution of 720×240. When the video encoder is configured to operate under the frame mode, the top field having video information of odd scan lines is combined with the subsequent bottom field having video information of even scan lines to generate a complete picture (i.e. a frame), and then the combined result is fed into the video encoder as an input picture having an equivalent resolution of 720×480.

Please refer to FIG. 3. FIG. 3 is a diagram illustrating a conventional video processing apparatus 100. The video processing apparatus 100 includes a video encoder 110 and an output buffer 120. Generally, the video encoder 110 encodes the input pictures and generates the output bitstream, and then the output buffer 120 temporarily stores the output bitstream before further operations.

Under certain conditions, the output buffer 120 might be full or close to full level due to network congestion, meaning that the data output rate of the output buffer 120 is smaller than the data input rate of the output buffer 120. When there is insufficient space within the output buffer 120, the video encoder 110 at this time has to reduce a bit count of the output bitstream by means of increasing a quantization step size of a quantizer 112 within the video encoder 110. However, increasing the quantization step size of the quantizer 112 inevitably introduces more quantization noise and hence users may perceive some blocking artifacts during playback of the output bitstream. As a result, the video display quality of the encoded video is degraded when the conventional video encoder 110 is adopted.

In addition, if video content of the video signal is complicated or noisy, for example, a "snowy" television signal, the video encoder 110 will generate an encoded output having considerable bits. Therefore, the output buffer 120 overflows easily. If the buffer size is not large enough, the quantization step size of the quantizer 112 is increased for solving the overflow condition.

In the aforementioned two conditions, the compressed video quality will be degraded greatly and the blocking artifact of the encoded video (i.e. the encoded output generated by the video encoder 110) occurs owing to the increased quantization step size of the quantizer 112.

Therefore, a novel mechanism of processing video signals for achieving a better video encoding quality is demanded.

SUMMARY OF THE INVENTION

It is therefore one of the objectives of the present invention to provide a method of processing an interleaved video and a video processing apparatus thereof, to solve the above mentioned problems.

According to one exemplary embodiment of the present invention, a method of processing an interleaved video including a plurality of fields is provided. The method includes the following steps. Firstly, a top field and a bottom field are received successively. Then one field from the two received field is selected as a selected field. An interpolated field for replacing an unselected field of the top field and the bottom field is generated, wherein a field motion between the selected field and the interpolated field is less than a field motion between the top field and the bottom field.

According to another exemplary embodiment of the present invention, a video processing apparatus for processing an interleaved video including a plurality of fields is provided. The video processing apparatus includes a receiving circuit and a video processor. The receiving circuit is implemented for receiving a top field and a bottom field successively. The video processor is coupled to the receiving circuit and the video processor includes a selecting circuit and an interpolating circuit. The selecting circuit in the video processor is implemented for selecting one of the top field and the bottom field as a selected field, and the interpolating circuit in the video processor is implemented for generating an interpolated field for replacing an unselected field of the top field and the bottom field, wherein a field motion between the selected field and the interpolated field is less than a field motion between the top field and the bottom field.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
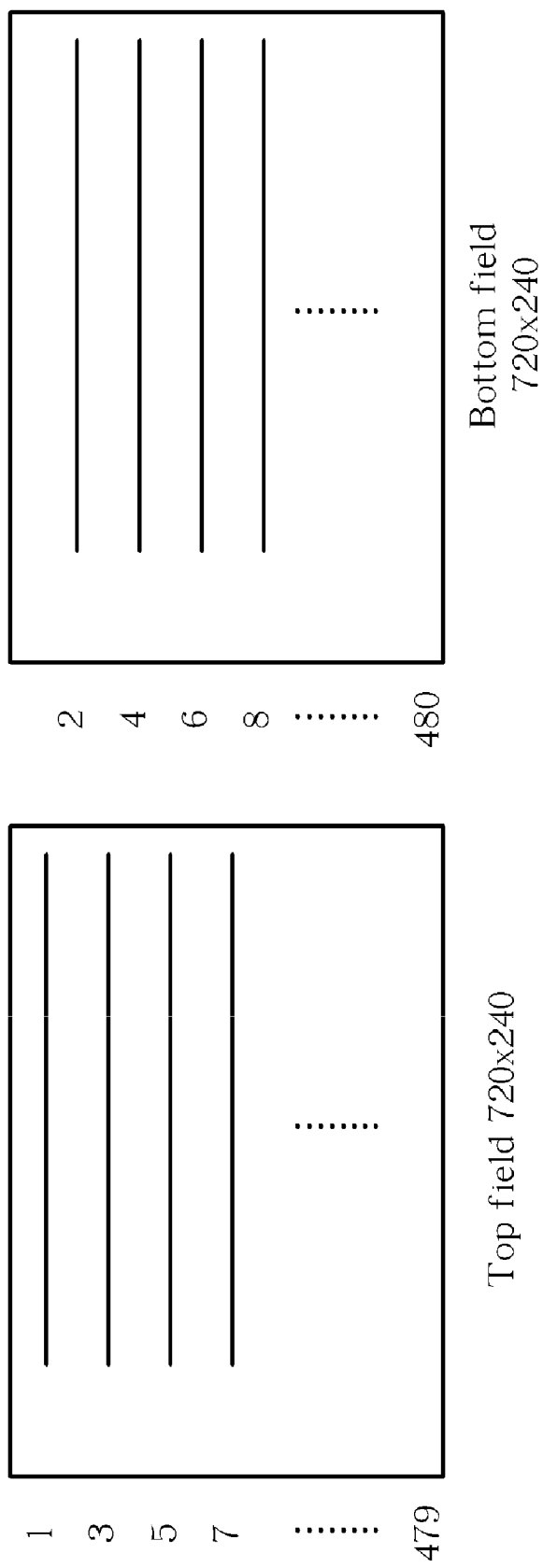
FIG. 1 is a diagram illustrating an input of a conventional field-mode encoder applied to an interleaved video.
Figure 2:
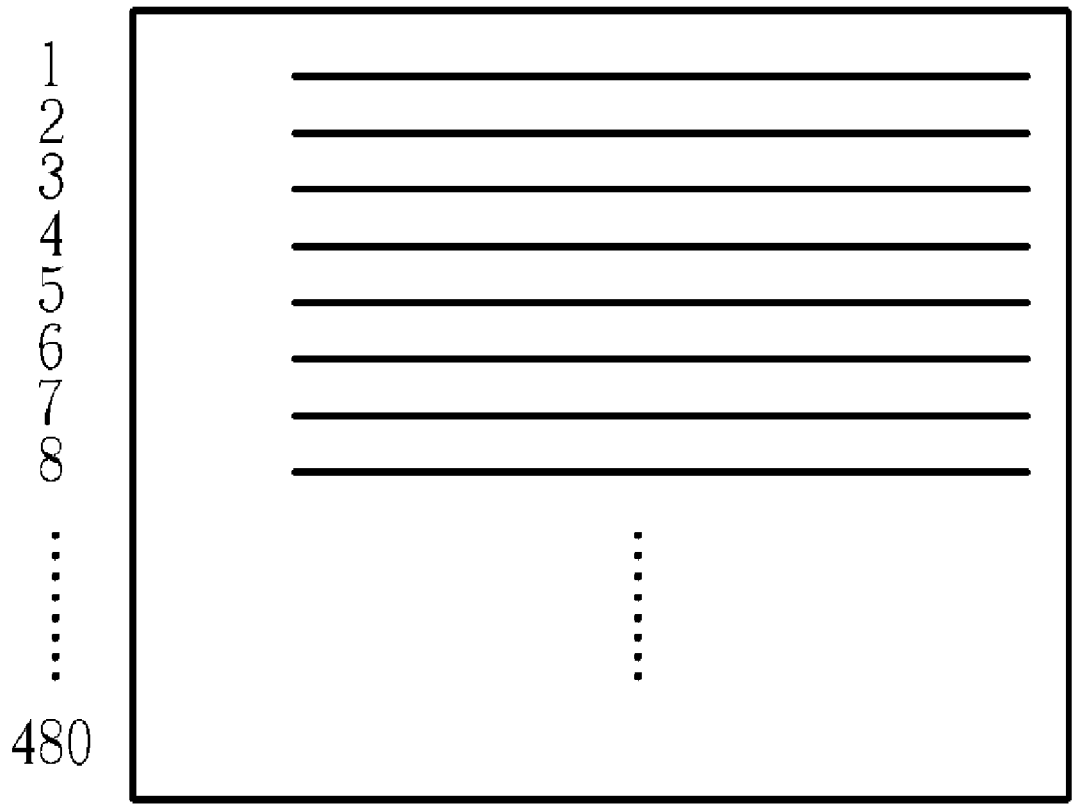
FIG. 2 is a diagram illustrating an input of a conventional frame-mode encoder applied to an interleaved video.
Figure 3:
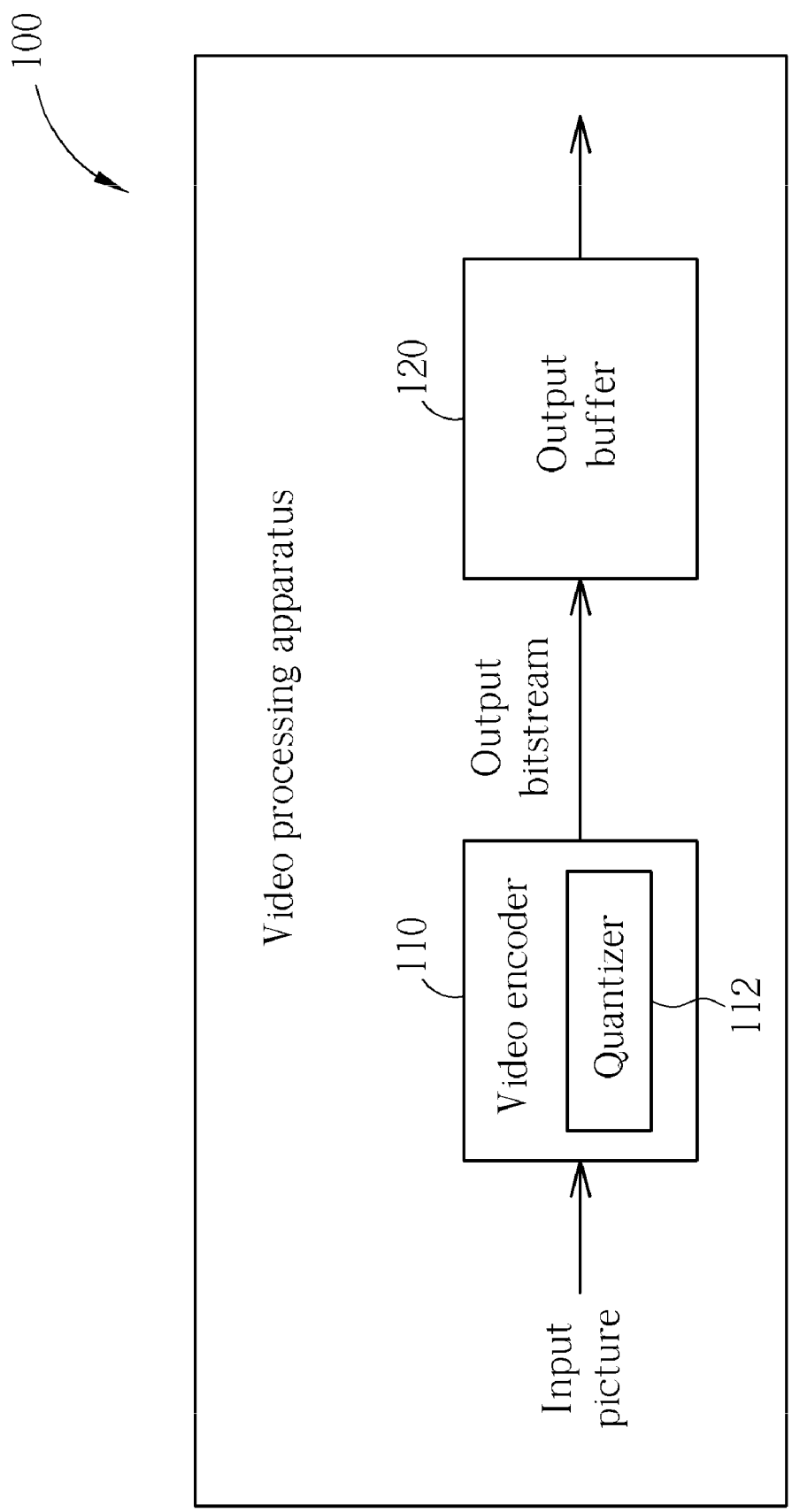
FIG. 3 is a diagram illustrating a conventional video processing apparatus.
Figure 4:
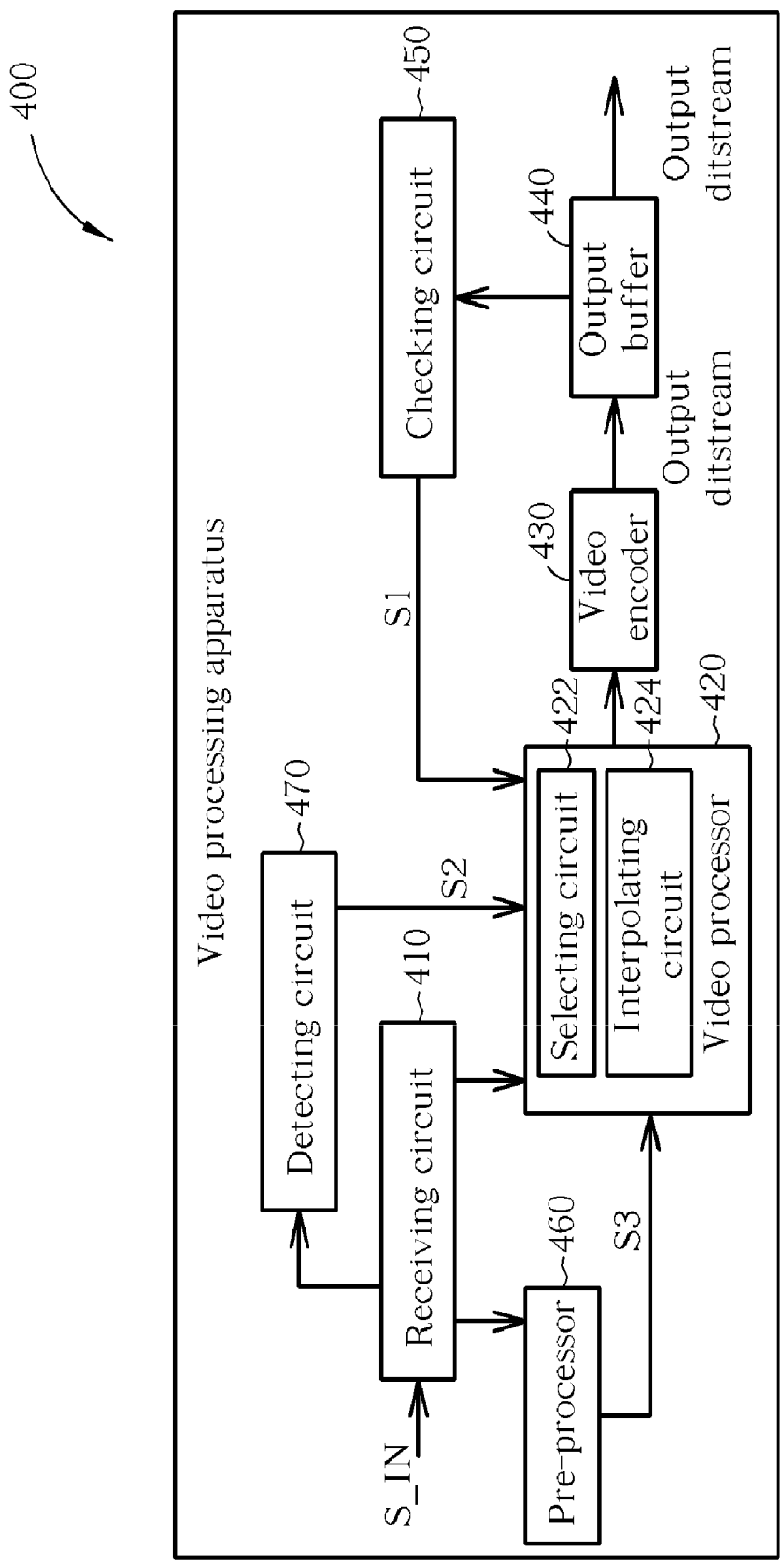
FIG. 4 is a diagram illustrating an exemplary embodiment of a video processing apparatus of the present invention.

Please refer to FIG. 4. FIG. 4 is a diagram illustrating an exemplary embodiment of a video processing apparatus 400 according to the present invention. In this exemplary embodiment, the video processing apparatus 400 has a receiving circuit 410 for receiving an interleaved video S_IN, a video processor 420, a video encoder 430, an output buffer 440, a checking circuit 450, a pre-processor 460, and a detecting circuit 470. In this embodiment, the video processor 420 includes a selecting circuit 422 and an interpolating circuit 424. In addition, the video processor 420 is coupled to the receiving circuit 410, the video encoder 430, the checking circuit 450, the pre-processor 460, and the detecting circuit 470 simultaneously.

However, the architecture of the video processing apparatus 400 shown in FIG. 4 is for illustrative purposes only, and is not meant to be a limitation of the present invention. Additionally, the components are shown as individual blocks for illustrative purposes only. That is, the components illustrated in FIG. 4 are not limited to be disposed separately in the video processing apparatus 400. Other hardware configurations obeying the spirit of the present invention are possible. The details of the relation between the components in this embodiment are described as follows.

Typically the video encoder 430 receives video input to perform the encoding operation and the output buffer 440 temporarily stores the encoded video before further processing of the encoded video. The video encoder 430 performs a plurality of operations to encode the interleaved video S_IN from the video processor 420 such as determining picture types as Intra-coded picture (I picture), Predictive-coded picture (P picture) or Bidirectional-predictive-coded picture (B picture) to encode the video signals with a sequence of a GOP (Group of Pictures), and the video encoder 430 further performs a discrete cosine transform (DCT) on blocks of the video signals, and quantizes the transformed coefficients by the DCT. The output buffer 440 buffers the output bitstream (compressed bitstream) temporarily and then delivers the output bitstream to a target apparatus (e.g. a display device) via the Internet or any communication means or directly stores the output bitstream into a storage device such as an optical storage or magnetic storage.

In the present invention, a field motion reduction mode of the video processor 420 is enabled or disabled according to an indication signal S1 generated from the checking circuit 450, an indication signal S2 generated from the detecting circuit 470, or a video content complexity indicator S3 generated from the pre-processor 460.

When a data amount T1 of the output buffer 440 reaches a predetermined threshold T_space (i.e. T1>T_space), the checking circuit 450 outputs the indication signal S1, indicative of the buffer full status, for notifying the video processor 420 to enable the field motion reduction mode. At this time, the generation of the indication signal S1 also implies that there is not enough space within the output buffer 440. In this embodiment, the video processing apparatus 400 activates the field motion reduction mode of the video processor 420, rather than increasing the quantization step size of the quantizer (not shown) in the video encoder 430. In addition, the pre-processor 460 pre-processes video content of the interleaved video S_IN to generate the video content complexity indicator S3 indicative of complexity of the video content. It should be noted that if the interleaved video S_IN suffers noise interference, the pre-processor 460 determines that the complexity of the video content is high.

Therefore, when a complexity value T2 of the video content complexity indicator S3 generated from the pre-processor 460 reaches a predetermined threshold T_complexity, i.e. T2>T_complexity, meaning that the video content of the interleaved video S_IN is complicated or noisy, the video processor 420 enables or enters the field motion reduction mode. In this exemplary embodiment, when the field motion reduction mode is enabled due to the indication signal S1 from the checking circuit 450 or the video content complexity indicator S3 from the pre-processor 460, the data amount of the following encoded output produced by the video encoder 430 is decreased as the video content fed into the video encoder 430 is simplified. Further description directed to operations under the enabled field motion reduction mode is detailed later.

Briefly summarized, when the video content of the interleaved video S_IN is complex and/or the output buffer 440 is almost full, the video processing apparatus 400 enables the field motion reduction mode of the video processor 420 to effectively reduce the data amount of the encoded output of the video encoder 430, rather than increasing a quantization step size of a quantizer (not shown) implemented in the video encoder 430. As the quantization step size of the quantizer within the video encoder 430 is not increased, the undesired blocking artifacts due to the quantization noise will not occur.

The operation of the video processor 420 under the field motion reduction mode is detailed as follows. The receiving circuit 410 receives a top field and a bottom field successively from a plurality of fields carried via the interleaved video S_IN. When the video processor 420 enters the field motion reduction mode, the video processor 420 controls the selecting circuit 422 to select one field from the top field and the bottom field successively received from the receiving circuit 410. At this time, after the selecting circuit 422 in the video processor 420 selects a field (e.g. the top field), the video processor 420 then controls the interpolating circuit 424 to generate an interpolating field for replacing an unselected field (e.g. the bottom field) received from the receiving circuit 410 previously.

In this embodiment, the video interpolating circuit 424 in the video processor 420 generates the interpolated field according to the selected field, neighboring fields of the selected field and the unselected field (e.g. one or more preceding top fields/bottom fields, or one or more following top fields/bottom fields), the selected field, the unselected field, or combinations thereof.

In a preferred embodiment of the present invention, the video interpolating circuit 424 generates the interpolated field to make a field motion between the selected field and the interpolated field less than a field motion between the selected field (e.g. the top field) and the unselected field (e.g. the bottom field). In this way, the video content complexity is equivalently reduced, and the data amount of the encoder output is decreased accordingly. Please note that any method capable of creating an interpolated field that meets the aforementioned field motion criteria can be employed by the interpolating circuit 424. These alternative designs all fall within the scope of the present invention.

It should be noted that when the video encoder 430 is implemented using a field-mode encoder, the video processor 420 outputs the selected field and the interpolated field to the video encoder 430 according to the field transmission order. For example, provided that the selected field is a top field and the interpolated field is for replacing the bottom field following the top field, the selected field and the interpolated field are delivered to the video encoder 430 successively.

Similarly, provided that the selected field is a bottom field and the interpolated field is for replacing the top field preceding the bottom field, the interpolated field and the selected field are delivered to the video encoder 430 successively. Suppose that the video encoder 430 is implemented using a frame-mode encoder. The video processor 420 further combines the selected field and the interpolated field to generate a single picture (i.e. a frame), and then delivers the single picture to the video encoder 430.

In addition, the selecting circuit 422 is not limited to always select the top field for every couple of incoming top field and bottom field. That is, the selecting circuit 422 can dynamically select one from each couple of incoming top field and bottom field as the selected field, and then the interpolating circuit 420 generates the desired interpolated field for replacing the unselected field. This also obeys the spirit of the present invention, and falls in the scope of the present invention.

The video processor 420 bypasses the interleaved video S_IN received by the receiving circuit 410 to the video encoder 430 if the field motion reduction mode is disabled, and controls the selecting circuit 422 and the interpolating circuit 424 to reduce the video complexity when the field motion reduction mode is enabled due to the indication signal S1 from the checking circuit 450 indicating that the data amount within the output buffer 440 reaches the predetermined threshold T_space or the complexity value of the video content complexity indicator S3 reaches the predetermined threshold T_complexity.

Please note that there is a premise that before the field motion reduction mode is enabled the video processing apparatus 400 checks whether the detection circuit 470 transmits the indication signal S2 indicating that the top field and the bottom field in the video processor 420 currently correspond to a still image.

After the video processor 420 is notified that the top field and the bottom field correspond to a still image, the video processor 420 then disables both the selecting circuit 422 and the interpolating circuit 424. In short, when the interleaved video S_IN is transmitting still images (i.e. the video content of the interleaved video has no motion), the detection circuit 470 generates the indication signal S2, indicative of still images, to force the video processor 420 to disable or leave the field motion reduction mode without regards to the presence of the indication signal S1 or the video content complexity indicator S3.

That is to say, in this embodiment, the video processor 420 is blocked from entering the field motion reduction mode when the indication signal S2 indicates that the interleaved video S_IN is transmitting top fields and bottom fields corresponding to still images. As there is no field motion between a top field and a subsequent bottom field when both the top field and the bottom field correspond to a still image, the video processor 420 does not enter the field motion reduction mode to perform redundant interpolation operations. It should be noted that the detection circuit 470 is optional. In other embodiments with the detection circuit 470 omitted, the same objective of reducing the video content complexity is achieved even though the video processor 420 enters the field motion reduction mode to process top fields and bottom fields corresponding to still images.

Figure 5:
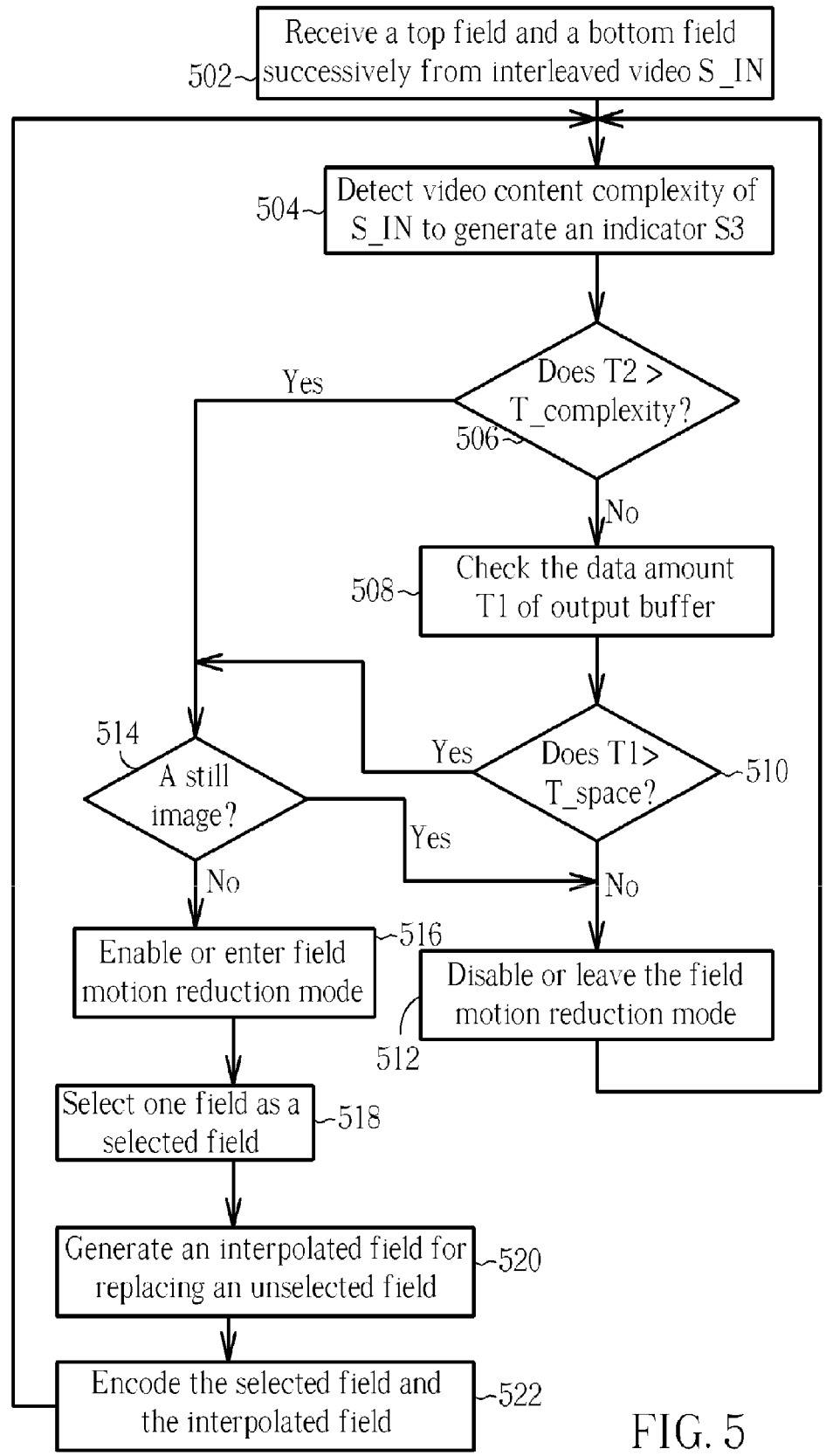
FIG. 5 is a flowchart illustrating an exemplary embodiment of a method of processing an interleaved video of the present invention.

Please refer to FIG. 5 in conjunction with FIG. 4. FIG. 5 is a flowchart illustrating a method of processing an interleaved video according to an embodiment of the present invention. Provided that the result is substantially the same, the steps are not limited to be executed in the exact order shown in FIG. 5. The method of processing an interleaved video is summarized as follows:

Step 502: The receiving circuit 410 receives a top field and a bottom field successively from an interleaved video S_IN (e.g. an interleaved NTSC signal).

Step 504: The pre-processor 460 detects the video content complexity of the interleaved video S_IN to generate a video content complexity indicator S3.

Step 506: Does a complexity value T2 of the video content complexity indicator S3 reach a predetermined threshold T_complexity? If yes, go to step 514; otherwise, go to step 508.

Step 508: The checking circuit 450 checks the data amount T1 of the output buffer 440.

Step 510: Does the data amount T1 reach a predetermined threshold T_space? If yes, go to step 514; otherwise, go to step 512.

Step 512: The video processor 420 disables or leaves the field motion reduction mode and bypasses the top field and the bottom field to the video encoder 430 for encoding. Go to step 504 to keep monitoring the following top field and bottom field received by the receiving circuit 410.

Step 514: The detecting circuit 470 detects if the current top field and bottom field correspond to a still image. If yes, go to step 512; otherwise, go to step 516.

Step 516: The video processor 420 enables or enters the field motion reduction mode.

Step 518: The selecting circuit 422 selects one field from the top field and the bottom field as a selected field.

Step 520: The interpolating circuit 424 generates an interpolated field for replacing an unselected field from the top field and the bottom field.

Step 522: The video processor 420 outputs the selected field and the interpolated field to the video encoder 430 for encoding. Go to step 504 to keep monitoring the following top field and bottom field received by the receiving circuit 410.

In one case where the data amount within the output buffer 440 reaches the predetermined threshold T_space and no still image is identified by the detecting circuit 470, steps 516-522 are performed. Otherwise, the video processor 420 performs step 512 and directly transmits (i.e. bypasses) the top field and bottom field to the video encoder 430. In other words, if the data amount T1 does not reach the predetermined threshold T_space, the video processing apparatus 400 performs a typical video encoding process as in the prior art.

In another case where the video content complexity is determined to be higher than the predetermined threshold T_complexity and no still image is identified by the detecting circuit 470, steps 516-520 are performed. Otherwise, the video processor 420 performs step 512 and directly transmits (i.e. bypasses) the top field and the bottom field to the video encoder 430. In other words, if a complexity value T2 of the video content complexity indicator S3 is smaller than the predetermined threshold T_complexity, the video processing apparatus 400 performs a typical video encoding process as in the prior art.

After reading the aforementioned description directed to operations of the video processing apparatus 400, a person skilled in this art can readily understand operations of the steps shown in FIG. 5. Therefore, further description of the method of processing an interleaved video is omitted here for brevity.

By applying the video processing apparatus and method of processing the interleaved video, a field motion between the selected field and the interpolated field is less than a field motion between the top field motion and the bottom field received successively by the receiving circuit. By decreasing the field motion of the encoded video, annoying blocking artifacts of the encoded video due to quantization noise are hence eliminated. As a result, because the quantization step size is not adjusted to a larger value when the output buffer is close to a full level or the video content of the interleaved video is complicated or noisy, the video quality is greatly improved over the prior art encoding scheme.

Those skilled in the art will readily observe that numerous modifications and alterations of the device and method may be made while retaining the teachings of the invention.

What is claimed is:

1. A method of processing an interleaved video including a plurality of fields, the method comprising:
   receiving a top field and a bottom field successively;
   selecting one of the top field and the bottom field as a selected field;
   generating an interpolated field for replacing an unselected field of the top field and the bottom field, wherein a field motion between the selected field and the interpolated field is less than a field motion between the top field and the bottom field; and
   encoding the selected field and the interpolated field to generate an encoded result; and
   storing the encoded result into a buffer.

2. The method of claim 1, wherein the step of generating the interpolated field comprises:
   generating the interpolated field according to the selected field.

3. The method of claim 1, wherein the step of generating the interpolated field comprises:
   generating the interpolated field according to at least one of neighboring fields of the top field and the bottom field.

4. The method of claim 1, further comprising:
   checking a data amount stored in the buffer;
   wherein the step of selecting one of the top field and the bottom field as the selected field and the step of generating the interpolated field for replacing an unselected field of the top field and the bottom field are performed when the data amount reaches a predetermined threshold.

5. The method of claim 1, further comprising:
   pre-processing the interleaved video to obtain a video content complexity indicator;
   wherein the step of selecting one of the top field and the bottom field as the selected field and the step of generating the interpolated field for replacing an unselected field of the top field and the bottom field are performed when the video content complexity indicator reaches a predetermined threshold.

6. The method of claim 1, further comprising:
   detecting whether the top field and the bottom field correspond to a still image;
   wherein the step of selecting one of the top field and the bottom field as the selected field and the step of generating the interpolated field for replacing an unselected field of the top field and the bottom field are not performed when the top field and the bottom field correspond to the still image.

7. A video processing apparatus for processing an interleaved video including a plurality of fields, the video processing apparatus comprising:
   a receiving circuit, for receiving a top field and a bottom field successively;
   a video processor, coupled to the receiving circuit, comprising:
   a selecting circuit, for selecting one of the top field and the bottom field as a selected field;
   an interpolating circuit, for generating an interpolated field for replacing an unselected field of the top field and the bottom field, wherein a field motion between the selected field and the interpolated field is less than a field motion between the top field and the bottom field; and
   a video encoder, coupled to the video processor, for encoding the selected field and the interpolated field to generate an encoded result; and
   an output buffer, coupled to the video encoder, for storing the encoded result generated from the video encoder.

8. The video processing apparatus of claim 7, wherein the interpolating circuit generates the interpolated field according to the selected field.

9. The video processing apparatus of claim 7, wherein the interpolating circuit generates the interpolated field according to at least one of neighboring field of the top field and the bottom field.

10. The video processing apparatus of claim 7, further comprising:
    a checking circuit, coupled to the output buffer and the video processor, for checking a data amount stored in the buffer and outputting an indication signal to the video processor;
    wherein the video processor enables the selecting circuit and the interpolating circuit when the indication signal indicates that the data amount reaches a predetermined threshold.

11. The video processing apparatus of claim 7, further comprising:
    a pre-processor, coupled to the video processor and the receiving circuit, for pre-processing the interleaved video to obtain a video content complexity indicator and outputting the video content complexity indicator to the video processor;
    wherein the video processor enables the selecting circuit and the interpolating circuit when the video content complexity indicator reaches a predetermined threshold.

12. The video processing apparatus of claim 7, further comprising:
    a detecting circuit, coupled to the receiving circuit and the video processor, for detecting whether the top field and the bottom field correspond to a still image and outputting an indication signal to the video processor;
    wherein the video processor disables the selecting circuit and the interpolating circuit when the indication signal indicates that the top field and the bottom field correspond to the still image.

13. A method of processing an interleaved video including a plurality of fields, the method comprising:
    receiving a top field and a bottom field successively;
    selecting one of the top field and the bottom field as a selected field;
    generating an interpolated field for replacing an unselected field of the top field and the bottom field, wherein a field motion between the selected field and the interpolated field is less than a field motion between the top field and the bottom field; and
    pre-processing the interleaved video to obtain a video content complexity indicator;

wherein the step of selecting one of the top field and the bottom field as the selected field and the step of generating the interpolated field for replacing an unselected field of the top field and the bottom field are performed when the video content complexity indicator reaches a predetermined threshold.

14. A video processing apparatus for processing an interleaved video including a plurality of fields, the video processing apparatus comprising:
- a receiving circuit, for receiving a top field and a bottom field successively;
- a video processor, coupled to the receiving circuit, comprising:
  - a selecting circuit, for selecting one of the top field and the bottom field as a selected field;
  - an interpolating circuit, for generating an interpolated field for replacing an unselected field of the top field and the bottom field, wherein a field motion between the selected field and the interpolated field is less than a field motion between the top field and the bottom field; and
- a pre-processor, coupled to the video processor and the receiving circuit, for pre-processing the interleaved video to obtain a video content complexity indicator and outputting the video content complexity indicator to the video processor;

wherein the video processor enables the selecting circuit and the interpolating circuit when the video content complexity indicator reaches a predetermined threshold.

* * * * *